United States Patent [19]

Ackerman

[11] 4,047,451
[45] Sept. 13, 1977

[54] VARIABLE SPEED DEVICE

[76] Inventor: Leonard Stanley Ackerman, 355 Lakeview Ave., Rockville Center, N.Y. 11570

[21] Appl. No.: 741,428

[22] Filed: Nov. 12, 1976

Related U.S. Application Data

[63] Continuation-in-part of Ser. No. 623,524, Oct. 17, 1975, abandoned.

[51] Int. Cl.² ............................................. F16H 37/06
[52] U.S. Cl. .............................. 74/665 H; 74/665 GC
[58] Field of Search ...................... 74/665 H, 194, 197, 74/665 GC

[56] References Cited

U.S. PATENT DOCUMENTS

| 3,323,384 | 6/1967 | Wodarka | 74/197 X |
| 3,375,724 | 4/1968 | Shepard | 74/194 |

*Primary Examiner*—Leonard H. Gerin
*Attorney, Agent, or Firm*—Frederick W. Turnbull

[57] ABSTRACT

A variable speed device comprising a pair of discs driven from a source of power each disc having rack teeth forming its surface. The device including also a pinion in mesh with the rack teeth of each disc mounted to be movable radially of the disc to vary the speed of an output shaft in relation to the rotation of said disc.

7 Claims, 7 Drawing Figures

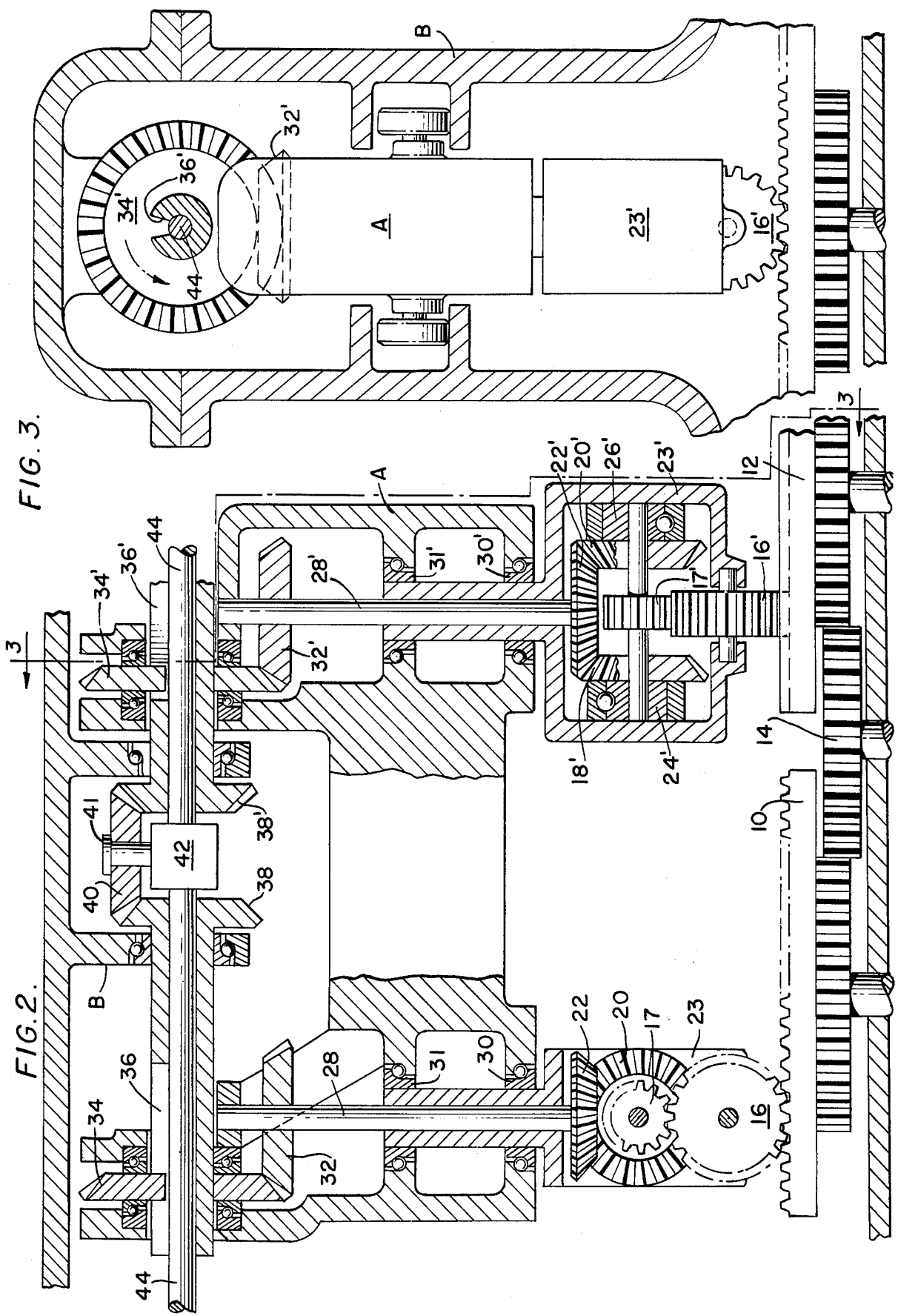

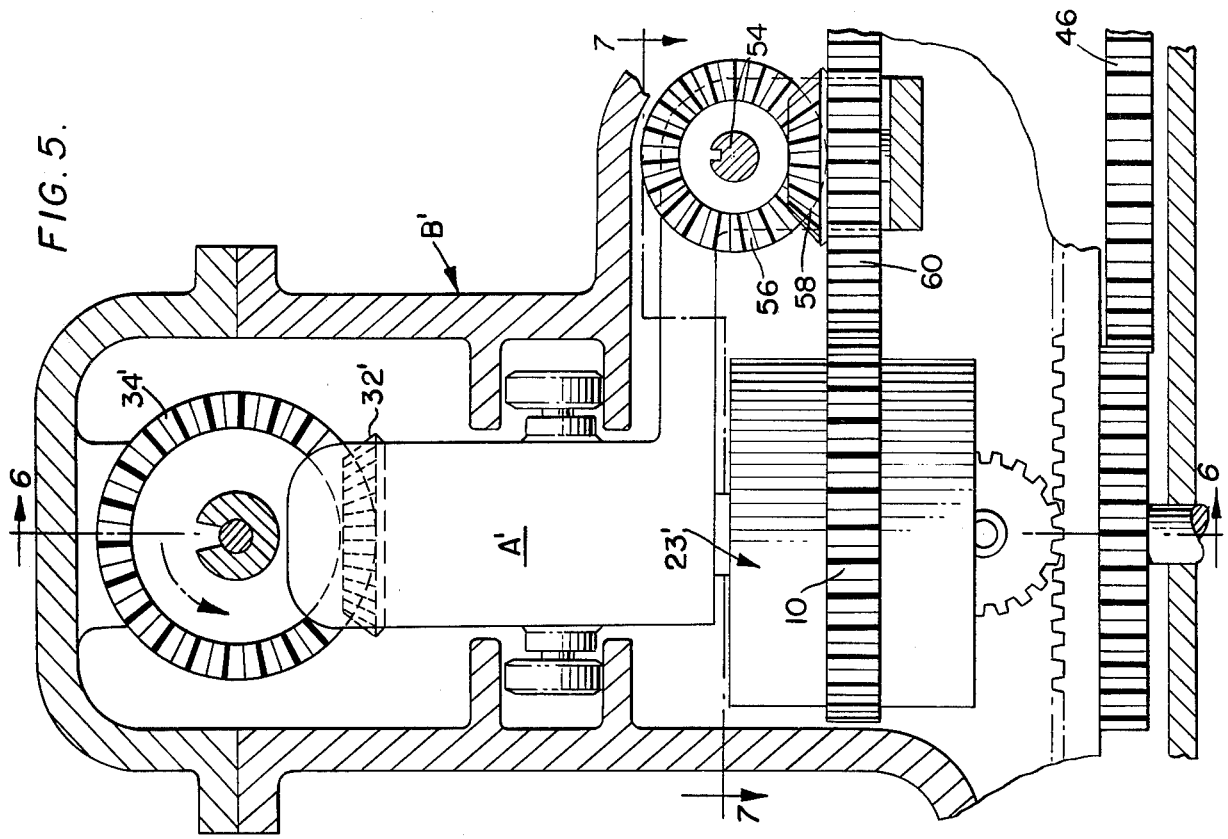
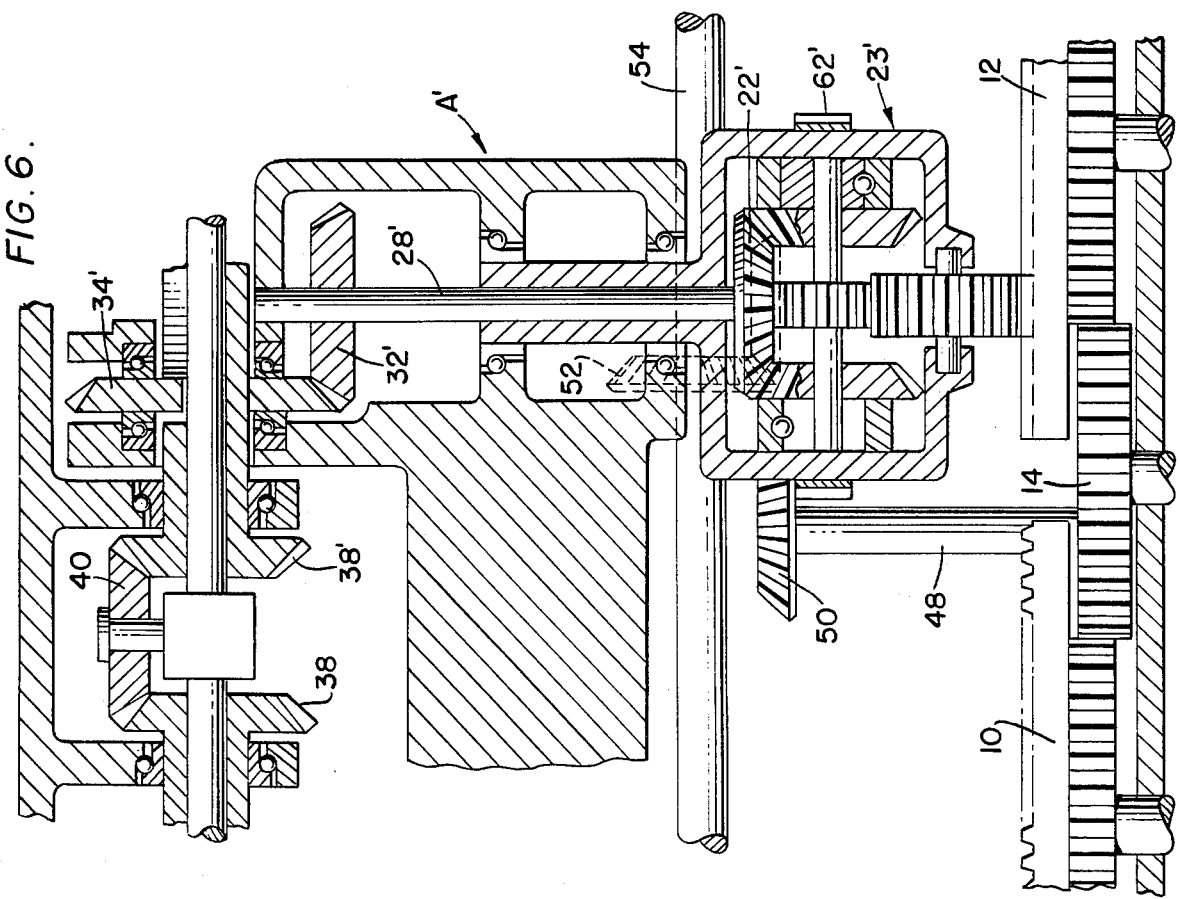

VARIABLE SPEED DEVICE

This application is a continuation in part of application Ser. No. 623,524 filed Oct. 17th, 1975, allowed Aug. 17, 1976, now abandoned.

Change speed devices are commonly used but when only toothed gears are used only stepwise changes of speed can be provided by known gear trains.

Friction devices have been suggested to give a variable speed drive, but slippage occurs between the driving and the driven friction devices so accuracy of speed at any time is uncertain.

Fluid devices have been used to provide a bridge between the steps of a gear change device, but, slippage occurs in such fluid devices, so, in use, they do not provide the accuracy of speed ratio between the input and output of the device desired. There must, then, be constant adjustment of the device.

It is an object of the present invention to provide a positive gear drive infinitely variable over its entire range of speeds.

Other and further objects will appear from the following specification taken with the accompanying drawings in which like reference characters refer to similar elements in the several views and in which:

FIG. 2 is a fragmentary side sectional view of the device;

FIG. 3 is a sectional view taken on line 3—3 of FIG. 2.

FIG. 5 is a sectional view similar to FIG. 3 showing the improvement;

FIG. 6 is a sectional view similar to FIG. 2; and

Gears that are always in mesh do not change their speed ratios, so in ordinary gear-shift variable speed ratio devices a plurality of sets of gears, each set providing a different gear ratio, are installed and a means is necessary to shift from one certain speed ratio to another certain speed ratio so that only a step-wise change of speed ratios are possible.

Figure 1:
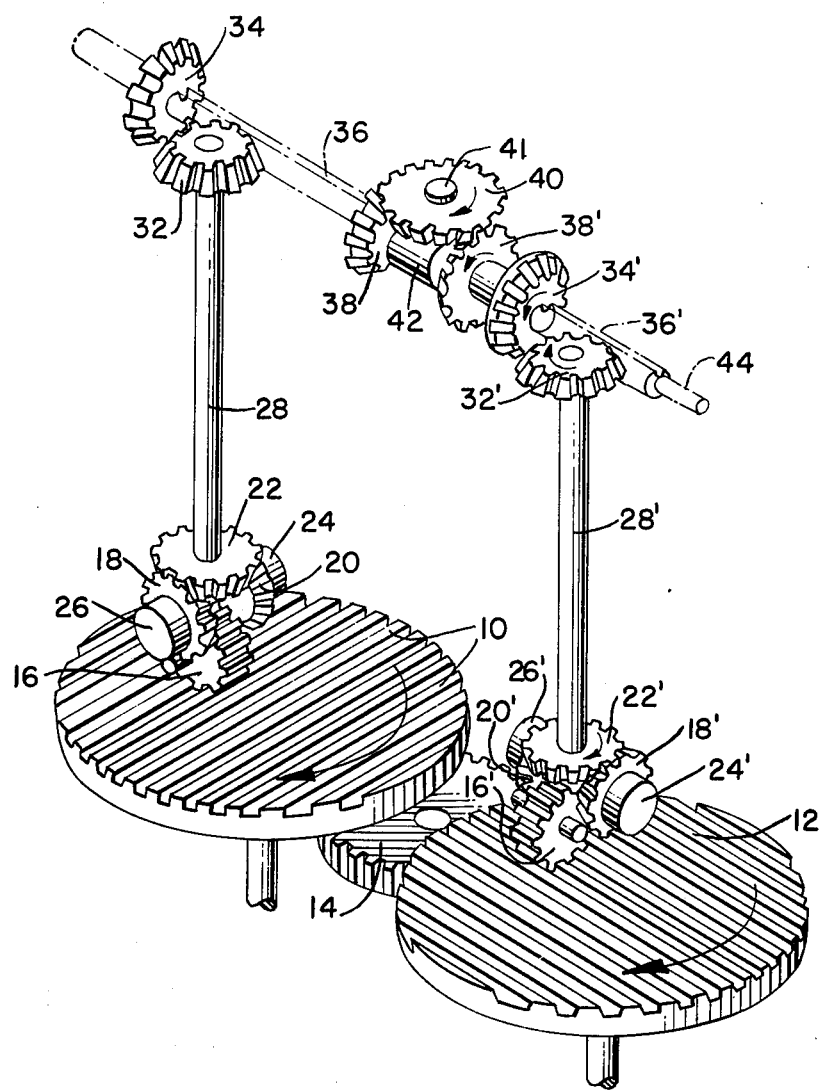
FIG. 1 is a schematic view of the device illustrating its operation.

We see in FIG. 1 which is schematic, that two discs of equal diameter, 10 and 12, are provided that are driven to rotate about their axes by an input gear 14 mounted on an input shaft driven by a source of power not shown. Each disc 10 and 12 is provided with rack teeth extending entirely across the faces of the disc and the discs are arranged so that the teeth of the racks of the two discs are always at right angles to each other as they are both driven at the same rotational speed.

A gear or pinion 16 meshes with the rack-teeth of disc 10 and an identical gear or pinion 16' meshes with the rack teeth of disc 12. Gears 16 and 16' are in mesh with gears 17 and 17' respectively (see in FIG. 2). Gears 17 and 17' are each keyed to a shaft that selectively drives level gears 18 or 20, and 18' or 20' respectively of the three-gear cluster 18, 22, 20 and 18', 22', 20', which are held in assembled relation by frames 23 and 23' respectively through one way clutch devices 24, 26 and 24' and 26' which clutches are arranged so that, regardless of the direction of rotation of gears 17 and 17' (see FIG. 2), the gears 22 and 22' will be rotated in the same direction.

Gears 16, 17, 18, 20 and 22, and gears 16', 17', 18', 20' and 22' are mounted in frame 23 or 23' respectively, which are rotatable on shafts 28 and 28' respectively (see FIG. 2). Gears 22 and 22' are keyed to shafts 28 and 28' respectively that extend through bearings 30, 31, and 30', 31' (FIG. 2). Bevel gears 32 and 32' are driven by shafts 28 and 28' respectively and will each be driven in only one direction regardless of the direction of rotation of gears 16, 16' in frame 23, 23'. Bevel gears 34, 34' mesh with bevel gears 32, 32' and are mounted to move with gears 32, 32'.

Bevel gears 34 and 34' will always be driven in the same direction by the trains of gears starting in one case with disc 10 and extending to gear 34, and starting in the other case with disc 12 and extending to gear 34'. These two trains of gears are mounted in movable carriage A to move together (as seen in FIG. 2), carriage A is guided in an outer frame B so the two gear trains always stay the same distance apart. The distance between the centers of shafts 28 and 28', which are parallel, is the same as the distance between the centers of discs 10 and 12.

If gears 16 and 16' were positioned directly over the centers of discs 10 and 12 the gears 16 and 16' would not rotate upon their own axes but would be rotated about the axis of shafts 28 and 28'. In this position gears 17 and 17' will not rotate on their own shafts and will not drive either gears 18 or 20 or gears 18' or 20'. Over running clutches 24, 26 and 24' and 26' will merely overrun. In this position, with gears 16 and 16' at centers of disc 10 and 12, no output will be transmitted to gears 34 and 34'.

Gears 34 and 34' are slidably keyed to shafts 36 and 36' respectively. Shafts 36 and 36' are mounted in suitable bearings in fixed frame B and lie in the plane of the axes of discs 10, 12 and of shafts 28, 28'. Bevel gears 38 and 38' each mesh with a bevel gear 40 which constitutes the planitating gear of differential gearing 38, 38', 40.

Bevel gear 40 is mounted for free rotation on a stub shaft 41 on a block 42. Block 42 is keyed to output shaft 44 that is concentric with shafts 36 and 36' (see FIG. 2), and as has been explained, when both gears 16 and 16' are centered on discs 10 and 12 respectively, no rotary motion will be transmitted to gears 34, 34' and therefore it will be seen that no rotary motion will be transmitted to output shaft 44. If, however, the assembly (carriage A) carrying the two gear trains extending from gear 16 to gear 34 and from gear 16' to gear 34' is moved to the left of the centers of discs 10 and 12 as shown in FIGS. 1 and 2, it will be seen that gear 16 will not be rotated at the moment by the rack teeth on disc 10, while gear 16' will be rotated counter-clockwise as seen from the right (as in FIG. 3) when the discs 10 and 12 are rotated clockwise looking down. See also FIG. 1.

Gears 16' being rotated counter-clockwise, gear 17' will rotate clockwise which will cause bevel gear 18' to be rotated clockwise to over running clutch 24' (see FIG. 2). Bevel gear 22', meshing with bevel gear 18', will be rotated clockwise looking downwardly and gears 20' will be driven idly counter-clockwise, over running clutch 26' being inoperative for the moment. Shaft 28' will, then, drive gear 32' clockwise looking down which, in turn will rotate gear 34' counter-clockwise as seen in FIG. 3.

Gear 38' rotating with gear 34' will try to drive gear 40 clockwise looking down in FIGS. 1 and 3. The axis of gear 40 will, of course not remain in the position shown on the drawings as block 42 rotates with shaft 44.

Gear 40, turning clockwise will try to turn gear 38 clockwise as seen from the right. It will be seen, however, that as any rotation of gear 16 in mesh with disc 10 would turn gear 38 counter-clockwise, the gear 38 can not be rotated clockwise due to over running clutches 24 or 26.

As discs 10 and 12 rotate clockwise looking down we see that the rack teeth on the tops of these discs will change their angle with respect to the plane of shafts 28, 28' until the rack teeth on disc 10 will be parallel to the plane of shaft 28, 28' at which time shaft 28, driven by gear 16 running on the rack teeth of disc 10 will rotate shaft 44, as explained above for shaft 28' driven by gear 16', and shaft 28' will not rotate as at that time the rack teeth of disc 12 will be normal to the plane of shafts 28, 28'.

Between the two positions gear 16' will decelerate from its maximum to zero rotation while gear 16 will accelerate from zero rotation (FIG. 1) to its maximum when the rack teeth on disc 10 lie parallel to the plane of shafts 28, 28', so the gears 38 and 38' will accelerate or decelerate as pinions 16, 16' accelerate or decelerate.

When shaft 28 is stationary, as in FIG. 1, and shaft 28' rotates, shaft 44 will be rotated at half the speed of gear 38' because of the differential action of sun gears 38, 38' on planitating gear 40. This same rotational speed will result when shaft 28' is stationary and shaft 28 is rotating at its maximum speed. As the speed of rotation of shaft 28', and therefore of gear 38', decelerates, the speed of rotation of shaft 28, and therefore gear 38 will accelerate. The differential action of sun gears 38 and 38' acting on planitating gear 40 of the differential gear cluster 38, 40, 38' will rotate shaft 44 at a constant speed for any specific location of pinions 16 and 16' with respect to the centers of discs 10 and 12.

When shaft 28 and shaft 28' are each rotating at half their maximum speed, gears 38 and 38' will be rotating at the same speed so shaft 44 will rotate at the same speed as it did when one shaft 28 or 28' was stationary.

If the gears 16 and 16' are moved to the left in FIGS. 1 and 2 the speed of rotation of shaft 44 with respect to the input will be increased, and if gears 16, 16' are moved to the right the output rotational speed of shaft 44 will be reduced until, as explained above, gears 16, 16' lie on the axes of discs 10 and 12 and shaft 44 will not be rotated at all.

It is seen then, that with all the toothed gears of the device being constantly in mesh an infinitely variable positive change speed device has been provided.

In the above it is noticed that the frames 23, 23' are rotated about the axes of shafts 28, and 28' by the teeth of gears 16, 16' meshing with the teeth of rotating rack-discs 10 and 12 respectively. This will cause undue wear on the teeth of gears 16, 16' and will tend to develop an axial upward thrust on gears 16, 16' which could result, in extreme cases, in gears 16, 16' losing mesh with rack-discs 10 and 12.

In order to minimize these possible problems in the device of FIGS. 1, 2, and 3, FIGS. 4, 5 and 6 show an improvement which, while not modifying the operation of the variable speed device, improves its operation.

Figure 4:
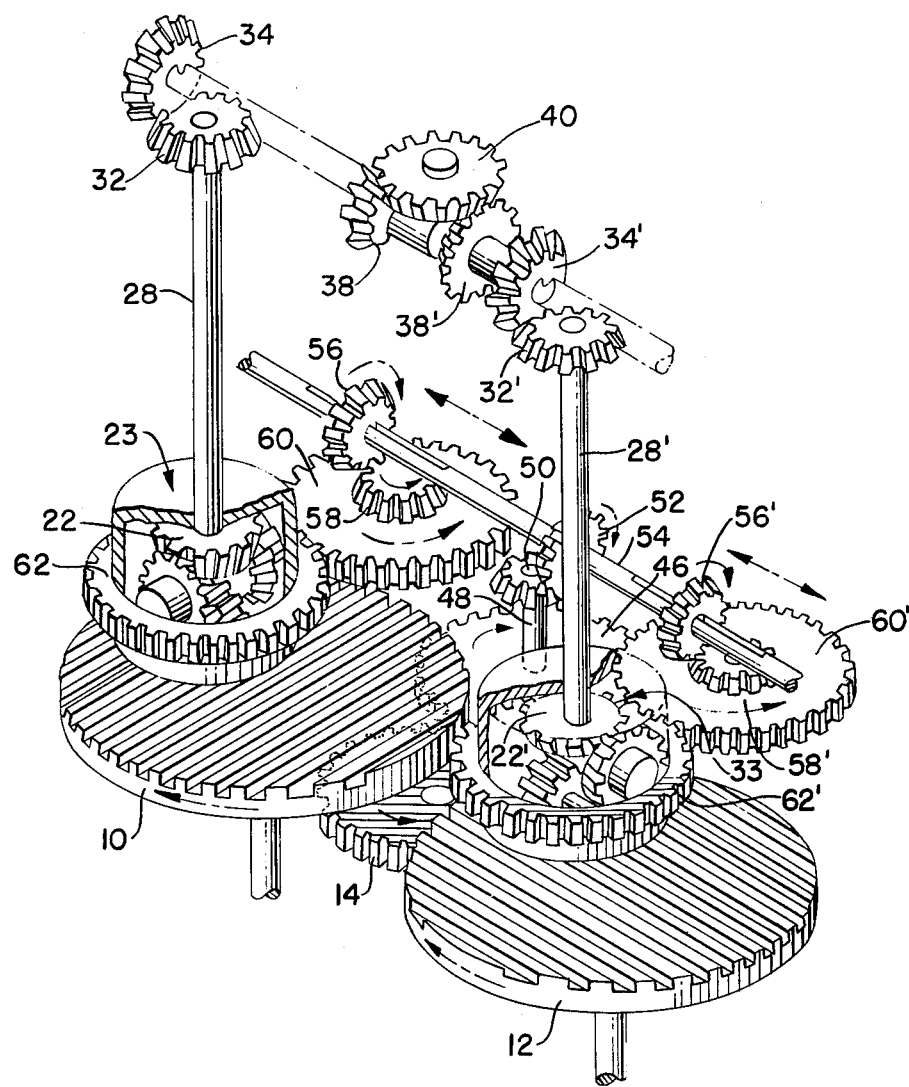
FIG. 4 is a view similar to FIG. 1 but including an improvement.
Figure 7:
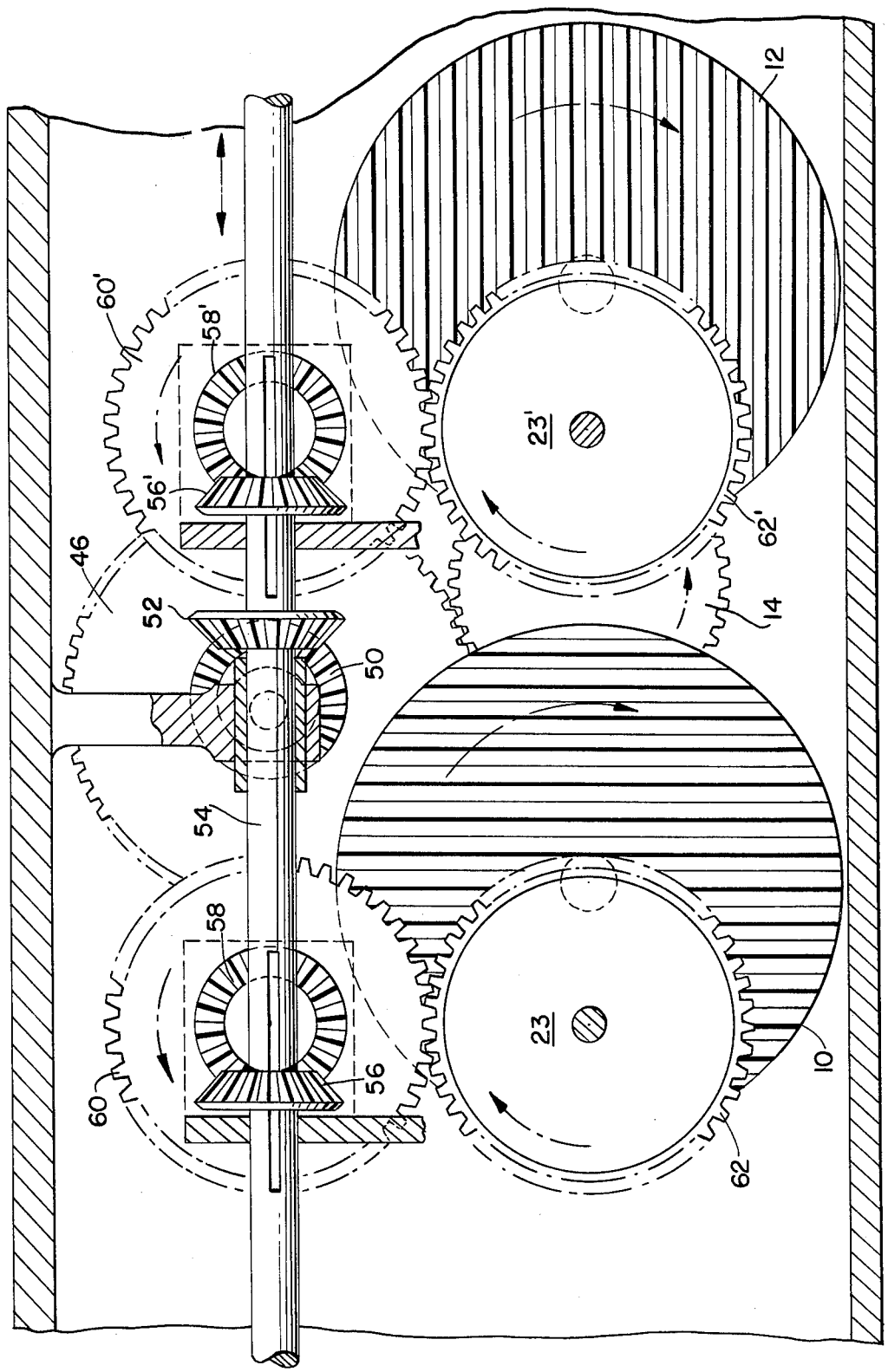
FIG. 7 is a plan view section taken at line 7—7 of FIG. 5.

Referring to FIG. 4 it will be seen that each element of the device seen in FIGS. 1, 2, and 3 are shown and are numbered as they are in FIGS. 1, 2 and 3.

As seen in FIG. 4 gear 14 that drives discs 10 and 12 to rotate at the same speed and in the same direction also drives a gear 46 that is of the same diameter as the gears on discs 10 and 12, so that gear 46 rotates at the same speed and in the same direction as discs 10 and 12. Gear 46 is keyed to a vertical shaft 48 at the top of which is a level gear 50 which meshes with a bevel gear 52 to drive gear 52 at the same rotational speed as discs 10 and 12. A shaft 54 keyed to bevel gears 52 is slotted to slidably engage a bevel gear 56 to one side of gear 52, and slidably engage a bevel gear 56' to the other side of bevel gear 52. Bevel gears 56, and 56' are mounted on brackets secured to Carriage A' so that, as frame A' is moved to move frames 23 and 23' with respect to discs 10 and 12, bevel gears 56 and 56' are moved in the same direction and the same distance. A bevel gear 58 is mounted on the bracket to be in mesh with bevel gear 56, and a bevel gear 58' is mounted to mesh with gear 56'. Gears 56 and 58 are the same diameter so drive at a 1—1 ratio. Gear 58 is secured to a gear 60 and gear 58' is secured to gear 60'. Gears 60 and 60' each mesh with a gear 62 and 62' respectively. Gears 62 and 62' are mounted on frames 23 and 23', and being of the same diameter as gears 60, 60' drive frames 23 and 23' at a 1—1 ratio. It is seen then that as gear 14 drives discs 10 and 12 in the same direction and at the same speed, gear 46 drives frames 23 and 23' in the same directions and at the same speed as discs 10 and 12 are driven.

It is clear, then, that the teeth on discs 10 and 12 will press at all times in a direction normal to the lengths of the teeth both of rack discs 10, 12 and of gears 16, 16' that mesh with them. There will be motion of the teeth of gears 16 and 16' along the teeth of racks 10 and 12 but, since the gears 16, 16' turn to have their teeth always parallel to the teeth on racks 10, 12, the forces from the racks is spread uniformly along the entire length of the teeth on gears 16, 16'.

Having thus disclosed my invention I claim:

1. A variable speed transmission comprising an output shaft, a planitating gear of a differential gear train driven by two sun gears, said planitating gear being operatively secured to said output shaft to drive said output shaft, an input shaft, a pair of identical discs driven at the same speed by said input shaft, the upper surface of each of said discs having a surface consisting of rack teeth extending thereacross the rack teeth of said discs lying at 90° to each other, a carriage movable in a plane above said discs normal to the surfaces of said discs and including the axes of said discs, a pair of gear trains mounted in said carriage each including a pinion in mesh with the rack teeth of one of said discs and extending to said sun gears meshing with said planitating gear, the distance between said pinions being the same as the distance between the axes of said discs.

2. The variable speed transmission of claim 1 in which a pair of over running clutch means is provided in each said gear train whereby said sun gears can be rotated in only one direction regardless of the direction of rotation of said pinions.

3. The variable speed transmission of claim 1 in which each of said pair of gear trains including a pinion in mesh with the rack teeth includes a rotatable shaft in a plane normal to and including the axes of said discs, a bevel gear keyed to the end of said vertical shaft spaced from said discs, a frame mounted on said shaft, a pair of bevel gears meshing with said bevel gear keyed to the end of said shaft, a common shaft mounted in each said frame carrying said pair of bevel gears, said frame being rotatably mounted on said vertical shaft, said common shaft being drivingly connected to said pinion, and one way clutch means connecting each of said pair of bevel gears in said frame to said common shaft whereby said rotatable shaft will be rotated in only one direction regardless of the direction of rotation of said pinion.

4. The variable speed transmission of claim 1 in which means is provided to rotate said pinions in mesh with said rack teeth about an axis normal to the plane of said discs at the same speed and in the same direction as said rack teeth.

5. The variable speed transmission of claim 3 in which a gear train is provided between the input shaft and each of said frames to rotate said frames at the same speed and in the same direction as said discs are driven.

6. A variable speed transmission comprising an output shaft, a planitating gear means of a differential gear train driven by two sun gears, said planitating gears means being operatively secured to said output shaft to drive said output shaft, an input shaft, a pair of identical disc surfaces driven at the same speed by said input shaft, each of said disc surfaces consisting of rack teeth extending thereacross, the rack teeth of said disc surfaces lying at 90° to each other, a carriage movable in a plane normal to said disc surfaces and including the axes of said discs, a pair of gear trains mounted in said carriage each said gear train including a pinion in mesh with the rack teeth of one of said disc surfaces, a pair of over running clutch means provided in each said gear train between said pinions in mesh with said disc surfaces and said sun gears, whereby said sun gears can be rotated in only one direction regardless of the direction of rotation of said pinions.

7. The variable speed transmission of claim 6 in which means is provided to rotate said pinions in mesh with said rack teeth about an axis normal to the plane of said discs at the same speed and in the same direction as said rack teeth.

* * * * *